(12) United States Patent
Fukuda et al.

(10) Patent No.: US 9,305,209 B2
(45) Date of Patent: Apr. 5, 2016

(54) BIOMETRIC AUTHENTICATION APPARATUS, BIOMETRIC AUTHENTICATION METHOD, AND COMPUTER PROGRAM FOR BIOMETRIC AUTHENTICATION

(71) Applicant: FUJITSU LIMITED, Kawasaki-shi, Kanagawa (JP)

(72) Inventors: Mitsuaki Fukuda, Sagamihara (JP); Takahiro Aoki, Kawasaki (JP); Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/495,222

(22) Filed: Sep. 24, 2014

(65) Prior Publication Data
US 2015/0010215 A1    Jan. 8, 2015

Related U.S. Application Data

(63) Continuation of application No. PCT/JP2012/058650, filed on Mar. 30, 2012.

(51) Int. Cl.
*G06K 9/00* (2006.01)
(52) U.S. Cl.
CPC ........ *G06K 9/00382* (2013.01); *G06K 9/00013* (2013.01); *G06K 9/00885* (2013.01); *G06K 2009/00395* (2013.01); *G06K 2009/00932* (2013.01)
(58) Field of Classification Search
CPC .......... G06K 9/00912; G06K 9/00375; G06K 9/00382; G06K 9/00389; G06K 9/00919
USPC .......................................................... 382/115
See application file for complete search history.

(56) References Cited

U.S. PATENT DOCUMENTS

| 8,000,503 | B2 * | 8/2011 | Kamata | ..................... G06K 9/00 340/5.52 |
| 2005/0148876 | A1 * | 7/2005 | Endoh | ..................... A61B 5/117 600/454 |

(Continued)

FOREIGN PATENT DOCUMENTS

| JP | 2002-117405 | 4/2002 |
| JP | 2006-277341 | 10/2006 |

(Continued)

OTHER PUBLICATIONS

A. El-Sallam, F. Sohel, and M. Bennamoun; "Robust Pose Invariant Shape-based Hand Recognition"; IEEE 2011.*
Extended European Search Report dated May 27, 2015 in corresponding European Patent Application No. 12872969.6.
Yuksel et al., "Hand vein biometry based on geometry and appearance methods", IET Computer Vision, vol. 5, Issue 6, 2011, pp. 398-406.

(Continued)

*Primary Examiner* — Stephen R Koziol
*Assistant Examiner* — Shaghayegh Azima
(74) *Attorney, Agent, or Firm* — Staas & Halsey LLP

(57) ABSTRACT

A biometric authentication apparatus includes a storage unit which stores first shape data representing a shape of biometric information of a registered user's hand with fingers at a first posture and second shape data representing a shape of biometric information of the hand with the fingers at a second posture; a posture specification unit which calculates an index representing a third posture of fingers of a user's hand in a biometric image; a biometric information extraction unit which generates third shape data representing a shape of biometric information of the user's hand in the biometric image; and a correction unit which obtains corrected shape data by correcting the first or the second shape data to cancel a shape difference of the biometric information due to a difference between the third posture and the first or the second posture based on the index for matching.

15 Claims, 9 Drawing Sheets

(56) References Cited

U.S. PATENT DOCUMENTS

| | | | |
|---|---|---|---|
| 2008/0063244 A1 | 3/2008 | Tanaka et al. | |
| 2012/0114255 A1* | 5/2012 | Kimura | G06K 9/00389 382/203 |
| 2012/0169464 A1 | 7/2012 | Aoki et al. | |

FOREIGN PATENT DOCUMENTS

| | | |
|---|---|---|
| JP | 2008-71030 | 3/2008 |
| JP | 2010-15365 | 1/2010 |
| JP | 2010-152706 | 7/2010 |
| WO | 2011/030441 A1 | 3/2011 |
| WO | 2012/029150 A1 | 3/2012 |

OTHER PUBLICATIONS

Yörük et al., "Hand biometrics", Image and Vision Computing, 24, 2006, pp. 483-497.

Yörük et al., "Shape-Based Hand Recognition", IEEE Transactions on Image Processing, vol. 15, No. 7, Jul. 2006, pp. 1803-1815.

Duta, "A survey of biometric technology based on hand shape", Pattern Recognition, 42, 2009, pp. 2797-2806.

International Search Report of PCT/JP2012/058650 mailed May 1, 2012.

Office Action dated Aug. 11, 2015 in corresponding Korean Patent Application No. 10-2014-7027430.

\* cited by examiner

BIOMETRIC AUTHENTICATION APPARATUS, BIOMETRIC AUTHENTICATION METHOD, AND COMPUTER PROGRAM FOR BIOMETRIC AUTHENTICATION

CROSS-REFERENCE TO RELATED APPLICATION

This application is a continuation application and is based upon PCT/JP2012/058650, filed on Mar. 30, 2012, the entire contents of which are incorporated herein by reference.

FIELD

The present invention relates to a biometric authentication apparatus, a biometric authentication method, and a computer program for biometric authentication that use an image capturing biometric information of, for example, a hand during biometric authentication.

BACKGROUND

Recent years have seen development of biometric authentication techniques for judging whether or not to authenticate an individual using biometric information such as a fingerprint or a hand vein pattern. Biometric authentication techniques are widely used, from large-scale systems with a number of registered users, such as access control systems, border control systems, or national identification number systems, to apparatuses used by specific individuals, such as computers or mobile terminals.

For example, in order to use a hand vein pattern as biometric information, a biometric authentication apparatus acquires a biometric image representing the vein pattern as an input biometric image. Then, the biometric authentication apparatus matches the input biometric information that is the vein pattern of a user represented in the input biometric image with registered biometric information that is a hand vein pattern represented in a biometric image of a registered user registered in advance. The biometric authentication apparatus authenticates the user as the registered user having proper authority when it judges that the input biometric information matches with the registered biometric information based on a result of the matching process. Additionally, the biometric authentication apparatus allows the user to use an apparatus incorporating the biometric authentication apparatus or another apparatus connected with the biometric authentication apparatus.

When a user registers biometric information in the biometric authentication apparatus (hereinafter referred to simply as "at the time of registration"), a posture of a body part including the biometric information is preferably the same as a posture of the body part when matching biometric information of the user and biometric information of a registered user is performed (hereinafter referred to simply as "at the time of matching"). The use of the same posture at the time of matching and at the time of registration increases a degree of similarity between a shape of biometric information captured in a biometric image obtained at the time of registration and a shape of biometric information captured in a biometric image obtained at the time of matching. As a result, a genuine acceptance rate is improved. However, practically, even when the registered user himself or herself requests authentication as a user, the posture of the body part including biometric information at the time of registration sometimes differs from the posture of the body part at the time of matching. Accordingly, the shape of biometric information captured in a biometric image obtained at the time of registration does not completely match with the shape of biometric information captured in a biometric image obtained at the time of matching.

Thus, techniques have been proposed for performing matching process by correcting or considering a difference between the shape of biometric information in an image at the time of registration and the shape of biometric information in an image at the time of matching due to a difference in posture (for example, see Japanese Laid-open Patent Publication No. 2002-117405 or Japanese Laid-open Patent Publication No. 2010-15365).

For example, Japanese Laid-open Patent Publication No. 2002-117405 discloses a palm-shape authentication method for matching a palm-shape image and a registered palm-shape image by detecting a rotation angle of a hand from palm-shape image data and correcting a positional deviation from a rotation angle of a registered hand in a registered palm-shape image registered in advance by detecting a palm-shape of a user.

In addition, Japanese Laid-open Patent Publication No. 2010-15365 discloses a biometric authentication apparatus that performs authentication by comparing at least a vein pattern image of a subject and a template of the subject based on evaluation results on a relative position between a skin surface pattern image of the subject and the template thereof.

SUMMARY

The technique disclosed in Japanese Laid-open Patent Publication No. 2002-117405 or Japanese Laid-open Patent Publication No. 2010-15365 assumes that the entire biometric information captured in one of biometric images similarly rotates or moves relative to biometric information captured in the other one thereof. However, due to a difference between a posture at the time of registration and a posture at the time of matching, the biometric information in the one of the biometric images can entirely positionally deviate from the biometric information in the other one thereof, as well as can be locally deformed thereagainst. Particularly, when using biometric information of a hand as biometric information for authentication, partial deformation may occur in the biometric information of the hand depending on the posture of a finger or fingers. In situations such as requiring a high level of security, such as financial transactions, or dealing with a numerous registered users, even a part that can cause such a deformation is preferably used in matching process in order to minimize a false acceptance rate. Meanwhile, even when positional correction is made on biometric information in one of the biometric images by movement, rotation, or the like, such a local deformation hinders favorable matching between the positionally corrected biometric information and biometric information in the other biometric image. This can reduce the genuine acceptance rate.

According to one embodiment, a biometric authentication apparatus is provided. The biometric authentication apparatus includes a storage unit which stores first shape data representing a shape of biometric information of a hand of a registered user in a state in which fingers of the hand take a first posture, a first index representing the first posture, second shape data representing a shape of biometric information of the hand of the registered user in a state in which the fingers of the hand take a second posture, and a second index representing the second posture; a biometric information acquisition unit which generates a biometric image representing biometric information of a hand of a user; a posture specification unit which calculates a third index representing a third posture of fingers of the hand of the user captured in the biometric image from the biometric image; a biometric information extraction unit which generates third shape data representing a shape of the biometric information of the hand of the user captured in the biometric image based on the biometric image; a correction unit which obtains corrected shape data by correcting the first shape data or the second shape data so as to cancel a shape difference of the biometric information due to a difference between the third posture and the first posture or the second posture according to a ratio of a difference between the third index and the first index or the second index to a difference between the first index and the second index; and a matching unit which matches the third shape data and the corrected shape data to obtain a degree of similarity between the biometric information of the hand of the user and the biometric information of the hand of the registered user.

The object and advantages of the invention will be accomplished and attained by means of the elements and combinations particularly pointed out in the claims.

It is to be understood that both the foregoing general description and the following detailed description are exemplary and explanatory but not restrictive of the invention, as claimed.

DESCRIPTION OF EMBODIMENTS

Hereinafter, a description will be given of a biometric authentication apparatus according to one embodiment of the invention with reference to the drawings.

The biometric authentication apparatus uses, in biometric authentication, a biometric image capturing a hand vein pattern that is an example of biometric information of a hand of a user. The biometric authentication apparatus acquires a biometric image representing a hand vein pattern in a state with fingers of the user open and a biometric image representing a hand vein pattern in a state with the fingers thereof closed at the time of registration in order to correct partial deformation of a vein pattern occurring near roots of the fingers due to a difference in the degree of openness of the fingers. Then, for each of the two biometric images, the biometric authentication apparatus registers an angle of each of the fingers and a vein position near the root of corresponding finger together with data representing a shape of the vein pattern. In addition, the biometric authentication apparatus obtains an angle of each finger from a biometric image acquired at the time of matching and corrects the vein position near the each finger in the data representing the shape of the registered vein pattern according to a difference between the angle obtained above and the angle of the each finger in each of the two biometric images obtained at the time of the registration. Then, the biometric authentication apparatus matches data representing a shape of the vein pattern with the corrected vein position and data representing a shape of a vein pattern obtained from the biometric image acquired at the time of the matching. In this way, the biometric authentication apparatus suppresses reduction in the genuine acceptance rate due to local deformation in the vein pattern caused by the difference between the finger posture at the time of registration and that at the time of matching. The hand vein pattern may be a vein pattern of either the palm or the back of the hand.

In the present specification, the term "matching process" is used to refer to process for calculating an index representing a degree of difference or a degree of similarity between the biometric information of a user and the biometric information of a registered user. Additionally, the term "biometric authentication process" is used to refer not only to matching process but also to entire authentication process including process for determining whether or not to authenticate a user by using indexes obtained by the matching process.

Figure 1:
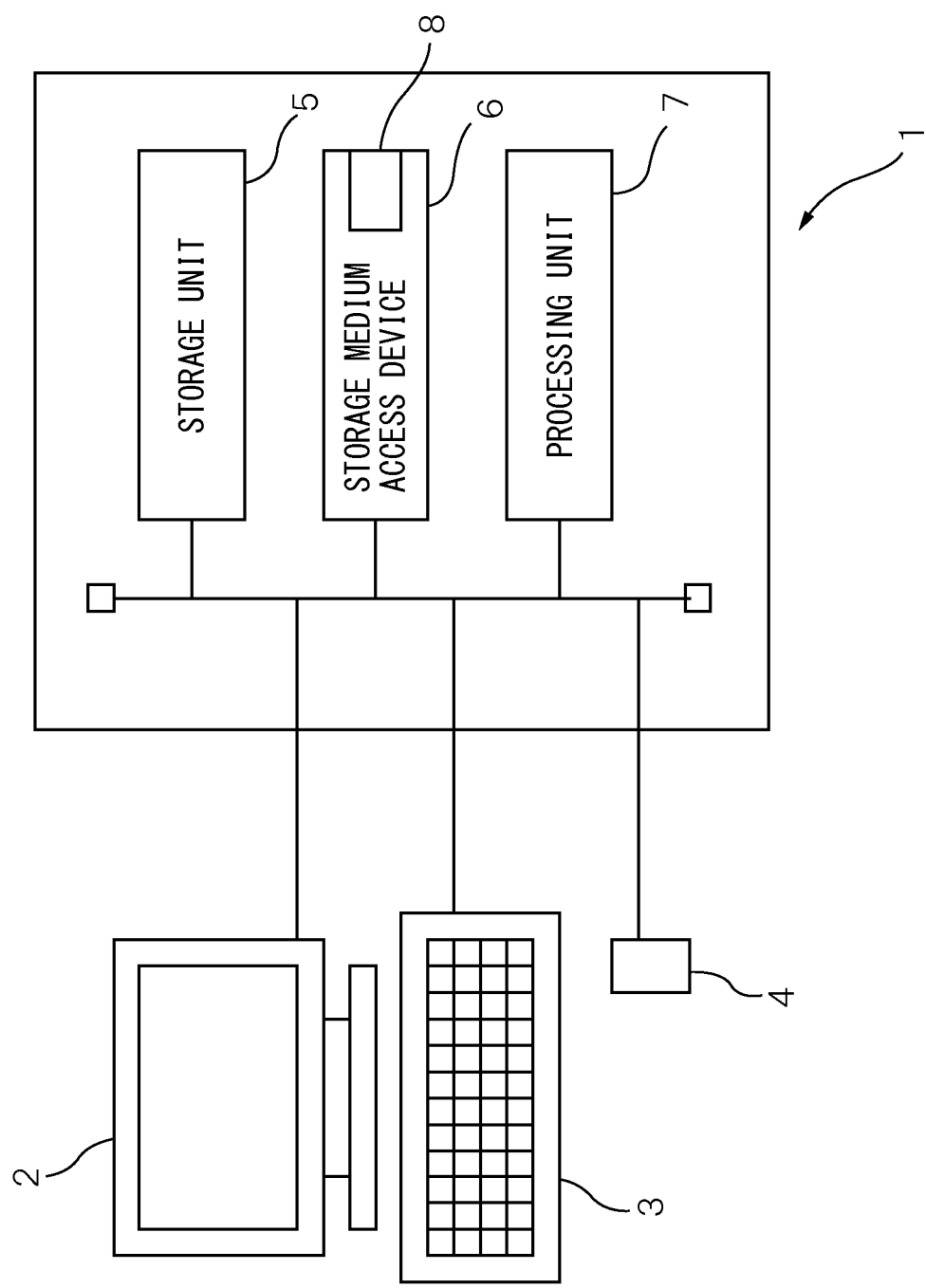
FIG. 1 is a schematic structural diagram of a biometric authentication apparatus.

FIG. 1 depicts a schematic structural diagram of a biometric authentication apparatus. As depicted in FIG. 1, a biometric authentication apparatus 1 includes a display unit 2, an input unit 3, a biometric information acquisition unit 4, a storage unit 5, a storage medium access device 5, and a processing unit 7. The display unit 2, the input unit 3, and the biometric information acquisition unit 4 may be provided independently of a housing that houses the storage unit 5, the storage medium access device 6, and the processing unit 7.

The biometric authentication apparatus 1 executes biometric authentication process by using a biometric image representing a hand vein pattern of a user generated by the biometric information acquisition unit 4 to match the vein pattern against a vein pattern of a registered user. Then, when the biometric authentication apparatus 1 authenticates the user as any one of registered users as a result of the biometric authentication, the user is allowed to use an apparatus incorporating the biometric authentication apparatus 1. Alternatively, the biometric authentication apparatus 1 transmits a signal indicating the acceptance of the user to another apparatus (not depicted) to allow the user to use the other apparatus.

The display unit 2 includes a display device, for example, such as a liquid crystal display or an organic electroluminescence display. The display unit 2 displays a message indicating a result of biometric authentication process executed by the processing unit 7, various kinds of application-related information, and the like.

The input unit 3 includes a user interface, for example, such as a keyboard, a mouse, or a touch pad. Then, user identification information such as a user name, a command, or data input by a user through the input unit 3 is sent to the processing unit 7. However, when the user does not have to input information other than biometric information into the biometric authentication apparatus 1, the input unit 3 may be omitted.

The biometric information acquisition unit 4 includes a vein sensor for generating a biometric image capturing a hand vein pattern of a user. The vein sensor includes, for example, a housing that allows the user to place his or her hand thereon, an infrared ray emitting diode arranged in the housing, an area sensor, and an image-forming optical system. The infrared ray emitting diode applies light to the hand placed on the housing. The image-forming optical system forms a vein pattern image of the hand applied light from the infrared ray emitting diode on the area sensor. The area sensor includes two-dimensionally arranged solid state image sensing devices sensitive to infrared ray. Each of the solid state sensing devices outputs a signal in accordance with the intensity of infrared ray, thereby generating a biometric image capturing the hand vein pattern image. Each pixel of the biometric image has a value, for example, in a range of from 0 to 255. The higher the luminance of the pixel, the larger the value of the pixel. In the present embodiment, a region capturing veins and a region not capturing the hand on the biometric image are dark, whereas a region of the hand without the veins is bright.

In the present embodiment, the biometric image is generated in such a manner that tips of the fingers are positioned on an upper end of the biometric image and parts of the fingers on a wrist side are positioned on a lower end thereof. Every time the biometric information acquisition unit 4 generates a biometric image, the biometric image is sent to the processing unit 7.

The storage unit 5 includes at least any one of, for example, a semiconductor memory, a magnetic disc device, or an optical disc device. The storage unit 5 then stores an application program used in the biometric authentication apparatus 1, a user name of at least one registered user, a user identification number thereof, personal setting information thereof, various kinds of data, and the like. In addition, the storage unit 5 stores a program for executing biometric authentication process. Furthermore, for each registered user, the storage unit 5 stores data relating to a hand vein pattern that is registered biometric information of the registered user together with identification information of the registered user, such as the user name of the registered user and a password thereof. In the present embodiment, data relating to the registered biometric information includes, for example, images representing vein pattern shapes and the angle of each finger obtained from biometric images having hand vein patterns captured in the fingers-open state and the fingers-closed state.

The storage medium access device 6 is a device that gains access to the storage medium 8, for example, such as a magnetic disc, a semiconductor memory card, or an optical storage medium. The storage medium access device 6 reads, for example, a computer program for biometric authentication stored in the storage medium 8 and executed in the processing unit 7 and sends to the processing unit 7 or causes the storage unit 5 to store the program.

The processing unit 7 includes one or more processors and peripheral circuits thereof. Then, the processing unit 7 executes biometric authentication process or registration process using biometric images acquired from the biometric information acquisition unit 4.

Figure 2:
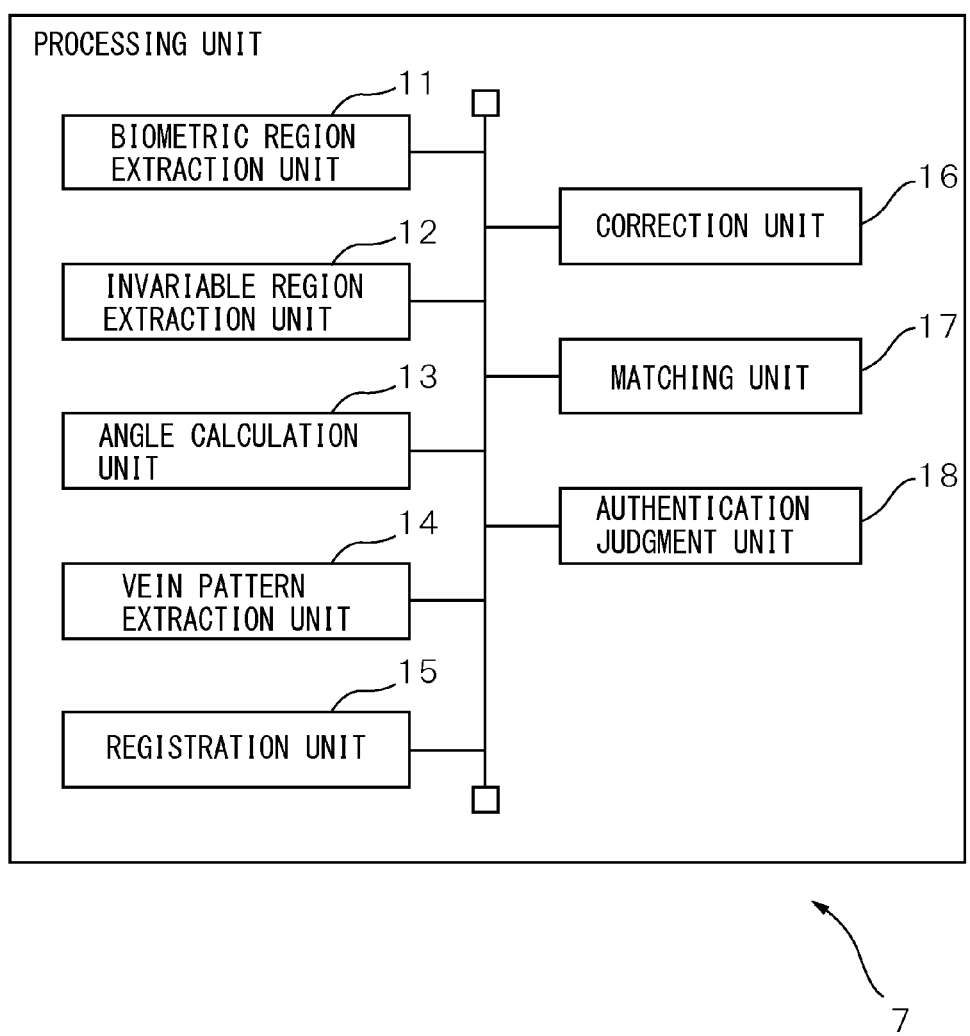
FIG. 2 is a functional block diagram of a processing unit according to one embodiment.

FIG. 2 is a functional block diagram of the processing unit 7. As depicted in FIG. 2, the processing unit 7 includes a biometric region extraction unit 11, an invariable region extraction unit 12, an angle calculation unit 13, a vein pattern extraction unit 14, a registration unit 15, a correction unit 16, a matching unit 17, and an authentication judgment unit 18. Each of the units included in the processing unit 7 is a functional module incorporated by the computer program executed on the one or more processors included in the processing unit 7. Alternatively, each of the units included in the processing unit 7 may be incorporated as a firmware in the biometric authentication apparatus 1.

The biometric region extraction unit 11, the invariable region extraction unit 12, the angle calculation unit 13, and the vein pattern extraction unit 14 are used in both of biometric authentication process and registration process. Additionally, the registration unit 15 is used in registration process. On the other hand, the correction unit 16, the matching unit 17, and the authentication judgment unit 18 are used in biometric authentication process.

Hereinafter, first, a registration process executed by the processing unit 7 will be described, and then followed by a description of biometric authentication process.

Registration Processing

Registration process is a process that generates data relating to registered biometric information from a biometric image capturing a hand vein pattern of a registered user, i.e., the registered biometric information, and then causes the storage unit 5 to store the data together with identification information such as a user name of a registered user. In the present embodiment, as described above, the data relating to registered biometric information include data obtained from a biometric image of a vein pattern taken with the fingers open and data obtained from a biometric image of a vein pattern taken with the fingers closed. Since the same process is performed on both of the biometric images, the following will describe a process on one of the biometric images, unless otherwise necessary. In the fingers-open state compared to the fingers-closed state, at least one pair of adjacent two fingers has a relatively large inter-finger open angle.

The biometric region extraction unit 11 detects, from a biometric image, pixels capturing a part of the hand of the user that have a higher luminance value than a predetermined threshold value. The biometric region extraction unit 11 executes labeling process on the detected pixels to extract a biometric region that is a region of the biometric image in which the hand has been partially or entirely captured. The predetermined threshold value can be defined, for example, as a value obtained by adding an offset value corresponding to a fluctuation range of luminance values of background pixels capturing nothing to a minimum value of luminance values of respective pixels of the biometric image.

The biometric region extraction unit 11 generates, as information representing the biometric region, for example, a binary image having the same size as that of the biometric image. Next, the biometric region extraction unit 11 sets the values of pixels included in the biometric region of the binary image to '1' and sets the values of the background pixels to '0'. Then, the biometric region extraction unit 11 sends the information representing the biometric region to the invariable region extraction unit 12, the angle calculation unit 13, and the vein pattern extraction unit 14.

The invariable region extraction unit 12 extracts an invariable region from the biometric region. The invariable region is a region in which a vein pattern included in the invariable region is not deformed regardless of the finger postures.

Figures 3A, 3B, 3C:
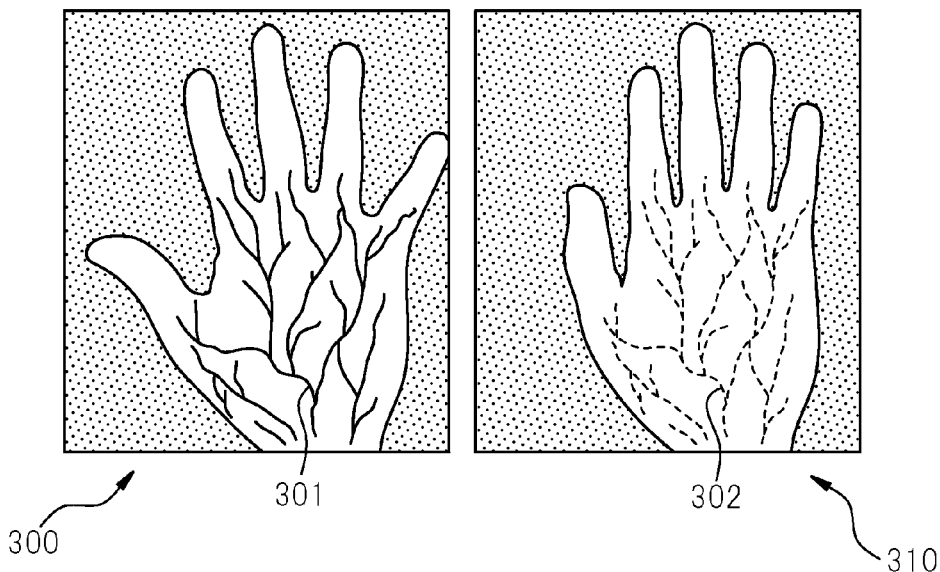
FIG. 3A is a view depicting an example of a hand vein pattern in a biometric image with fingers open.
FIG. 3B is a view depicting an example of a hand vein pattern in a biometric image with the fingers closed.
FIG. 3C is a view obtained as a result of superimposition of the vein pattern of FIG. 3A and the vein pattern of FIG. 3B.

FIG. 3A is a view depicting an example of a hand vein pattern in a biometric image with fingers open; FIG. 3B is a view depicting an example of a hand vein pattern in a biometric image with the fingers closed; and FIG. 3C is a view in which the vein pattern depicted in FIG. 3A and the vein pattern depicted in FIG. 3B has been superimposed on each other.

Near the root of a finger, the position of a vein connected to the finger varies depending on the angle of the finger. Accordingly, comparison of a vein pattern 301 captured in an image 300 depicted in FIG. 3A with a vein pattern 302 captured in an image 310 depicted in FIG. 3B indicates that there is a difference in parts near the roots of the fingers between the vein patterns. This is obvious, for example, by referring to FIG. 3C.

On the other hand, in a region 303 depicted in FIG. 3C, the positions of veins do not vary even when the fingers are moved, so that the region of the vein pattern 301 substantially matches with that of the vein pattern 302. Thus, the region 303 is an invariable region.

The invariable region extraction unit 12 obtains a positional deviation amount when the best matching between the two biometric images, for example, by performing a pattern matching while shifting a relative position of the biometric image corresponding to the fingers-closed state with respect to the biometric image corresponding to the fingers-open state. The invariable region extraction unit 12 may obtain the positional deviation amount by performing a pattern matching between parts of the respective biometric images including a center of the biometric region. Then, the invariable region extraction unit 12 moves at least one of the two biometric images so as to cancel the positional deviation amount and causes the vein patterns captured in the two biometric images to match with each other as much as possible.

The invariable region extraction unit 12 divides one of the two biometric images into a plurality of partial regions in the state in which the positions of the vein patterns of the two biometric images are matched with each other. A size of each partial region is set, for example, to be smaller than sizes of parts in which the positions of the veins vary depending on the angles of the fingers. Then, the invariable region extraction unit 12 obtains a normalized cross correlation value between each partial region including a part of the biometric region and a partial region at a position corresponding thereto in the other biometric image and extracts partial regions having a normalized cross correlation value not less than a predetermined threshold value, as invariable region candidates. The predetermined threshold value is set to a lower limit value of the normalized cross correlation value, at which the images of objects captured in two respective partial regions can be regarded as matching with each other, for example, a value of from 0.8 to 0.9.

The invariable region extraction unit 12 executes labeling process on the invariable region candidates to connect with each other invariable region candidates that are adjacent to each other. Next, the invariable region extraction unit 12 designates the largest among the groups of the connected invariable region candidates as an invariable region.

Alternatively, a plurality of reference hand model images may be prepared in advance that represent a positional relationship between the outline of a hand and an invariable region, and the reference model images may be stored in the storage unit 5. In this case, the invariable region extraction unit 12 executes a pattern matching between a biometric image and each of the plurality of reference model images to select a reference model image most closely matching with the biometric image. Then, the invariable region extraction unit 12 may cause the outline of the hand in the selected reference model image to match with the outline of the hand in the biometric image to designate, in this state, a region of the biometric image overlapping with the invariable region set in the reference model image, as an invariable region of the biometric region.

Next, the invariable region extraction unit 12 sets up a reference coordinate system used as a reference for obtaining the angle of each finger with reference to the invariable region. For example, when the two biometric images are positionally matched with each other as described above, the center of each biometric image is set as an origin of the reference coordinate system in the positionally matched state. Then, the invariable region extraction unit 12 sets up an axis x of the reference coordinate system to be parallel to a horizontal direction of the one of the two biometric images that has not been moved and sets up an axis y of the reference coordinate system to be parallel to a vertical direction of the one of the biometric images. Accordingly, for example, when the other one of the biometric images that has been moved is rotated clockwise by an angle θ, the axes x and y of the reference coordinates are set to be directed in directions in which the axes are rotated counterclockwise by the angle θ from the horizontal direction and the vertical direction, respectively, of the image that has been moved.

In addition, even when the invariable region of each of the biometric images is set up based on the reference model image, the center of each biometric image is set as the origin of the reference coordinate system. Additionally, when the biometric image is rotated clockwise by the angle θ with respect to the reference model image, the axes x and y of the reference coordinate system are also set to be directed in the directions in which the axes are rotated counterclockwise by the angle θ from the horizontal direction and the vertical direction, respectively, of the image.

Furthermore, as information representing the invariable region of each biometric image, the invariable region extraction unit 12 generates, for example, a binary image having the same size as that of the biometric image. Then, the biometric region extraction unit 11 sets the values of pixels included in the invariable region of the binary image to '1' and the values of the other pixels to '0'.

The invariable region extraction unit 12 sends the information representing the invariable region of each biometric image and the coordinates of the origin and the directions of the coordinate axes in the reference coordinate system set up in the biometric image to the angle calculation unit 13, the vein pattern extraction unit 14, and the registration unit 15.

The angle calculation unit 13 is an example of a posture specification unit and obtains the angle of each finger captured in the biometric image representing the vein pattern in the fingers-closed state as an example of a first index representing the posture of the fingers. In addition, the angle calculation unit 13 obtains the angle of each finger captured in the biometric image representing the vein pattern in the fingers-open state as an example of a second index representing the posture of the fingers. To obtain them, first, the angle calculation unit 13 obtains a centerline along a longitudinal direction of each finger in the biometric image. Then, the angle calculation unit 13 scans horizontally sequentially from the upper end of the biometric image to detect contour pixels positioned in the contour of the finger that are adjacent to a background region within the biometric region. Next, the angle calculation unit 13 extracts the contour pixels as the contour of the finger on the scanning line when the number of pixels of the biometric region sandwiched between adjacent contour pixels corresponds to a lateral width of the finger. Then, the angle calculation unit 13 obtains the contour of each finger by connecting contour pixels adjacent in a substantially vertical direction.

The angle calculation unit 13 may detect the region capturing the individual fingers in the biometric image by using any of other various techniques for detecting a region capturing fingers in an image.

The angle calculation unit 13 obtains, in each finger, the coordinates of middle points between left-end contour pixels of the finger and right-end contour pixels thereof at two points with different heights in the axis y direction of the reference coordinate system. Then, the angle calculation unit 13 defines a line connecting the two middle points as the centerline of the finger.

Figure 4:
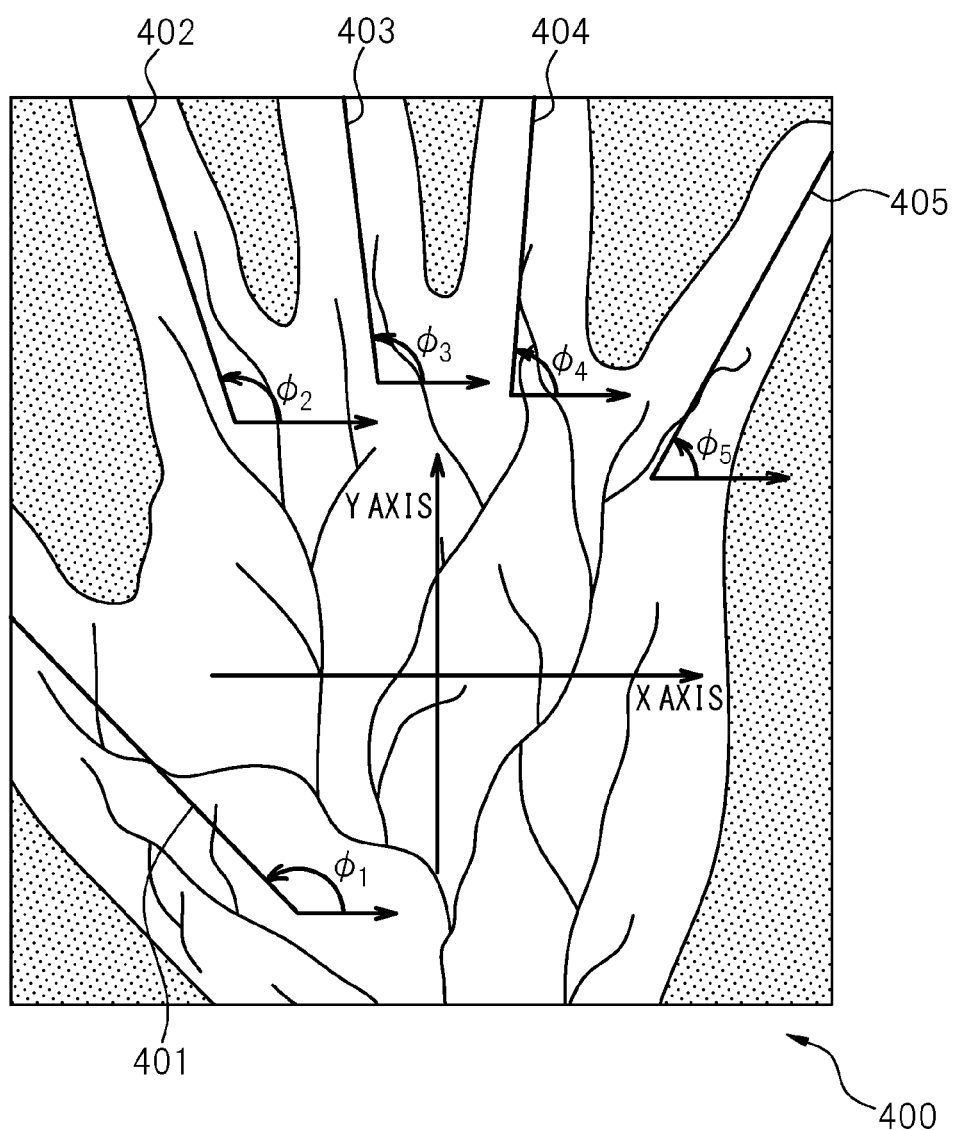
FIG. 4 is a view depicting an example of an angle of each finger.

FIG. 4 is a view depicting an example of the angle of each finger. In a biometric image 400 depicted in FIG. 4, each of the axes x and y represents the coordinate axis of the reference coordinate system. Then, the angle calculation unit 13 calculates angles $\phi_1$ to $\phi_5$ of respective fingers by regarding angles formed by centerlines 401 to 405 of the respective fingers and the axis x as the angles of the respective fingers. For example, an angle $\phi_1$ of the thumb is an angle formed by the centerline 401 of the thumb and the axis x, and in this example, $\phi_1=120°$. The angle calculation unit 13 sends the angles of the respective fingers in each biometric image to the vein pattern extraction unit 14 and the registration unit 15.

The vein pattern extraction unit 14 is an example of a biometric information extraction unit and extracts the hand vein pattern from the biometric region in the biometric image. To do this, the vein pattern extraction unit 14 binarizes respective pixels in the biometric region into vein pixels capturing the veins and having a pixel value below a predetermined threshold value and the other pixels having a pixel value not less than the predetermined threshold value. The predetermined threshold value is set to, for example, a mean value of the values of the pixels in the biometric region.

The vein pattern extraction unit 14 performs thinning process on the vein pixels of the biometric image extracted by the binarization to generate a vein pattern image in which individual veins are represented by a line having a single-pixel width. The vein pattern image is an example of shape data representing a shape of biometric information of a hand.

Furthermore, the vein pattern extraction unit 14 compares the vein pattern image with the invariable region to specify pixels deviating from the invariable region and capturing veins nearer to the fingers than the invariable region. A part of the veins captured in the specified pixels changes positions thereof depending on the postures of the fingers. Thus, the specified pixels are hereinafter referred to as variable vein pixels, for convenience.

The vein pattern extraction unit 14 obtains position specifying information of each variable vein pixel, which is used to find a pair of variable vein pixels capturing the same parts of the veins in the two biometric images when performing vein pattern correction at the time of matching. Thus, regarding each of the variable vein pixels, the vein pattern extraction unit 14 detects, along a vein captured in the each variable vein pixel, a pixel at which the vein reaches a boundary of the invariable region as an invariable boundary pixel, and obtains coordinates of the pixel in the reference coordinate system. The vein pattern extraction unit 14 detects an invariable boundary pixel corresponding to each variable vein pixel and counts the number of pixels from the variable vein pixel to the invariable boundary pixel along the vein. Then, the vein pattern extraction unit 14 relates the coordinates of the corresponding invariable boundary pixel and the number of pixels from the invariable boundary pixel as position specifying information to each variable vein pixel.

Furthermore, a part of the vein captured in each variable vein pixel is expected to shift depending on an angle of a finger closest to a part thereof. Thus, the vein pattern extraction unit 14 specifies a centerline closest to each variable vein pixel among the centerlines of the respective fingers and relates an identification number of a finger corresponding to the closest centerline to the relevant variable vein pixel. The identification number of the finger is also an example of the position specifying information.

The vein pattern extraction unit 14 sends the vein pattern images and each variable vein pixel and its position specifying information to the registration unit 15.

Upon execution of registration process, the registration unit 15 stores the identification information of the user input through the input unit 3 together with the invariable region representing information, the vein pattern images, the each variable vein pixel and its position specifying information, and the angles of the respective fingers in the storage unit 5. In this way, the user is registered as a registered user allowed use of an apparatus incorporating the biometric authentication apparatus 1.

Figure 5:
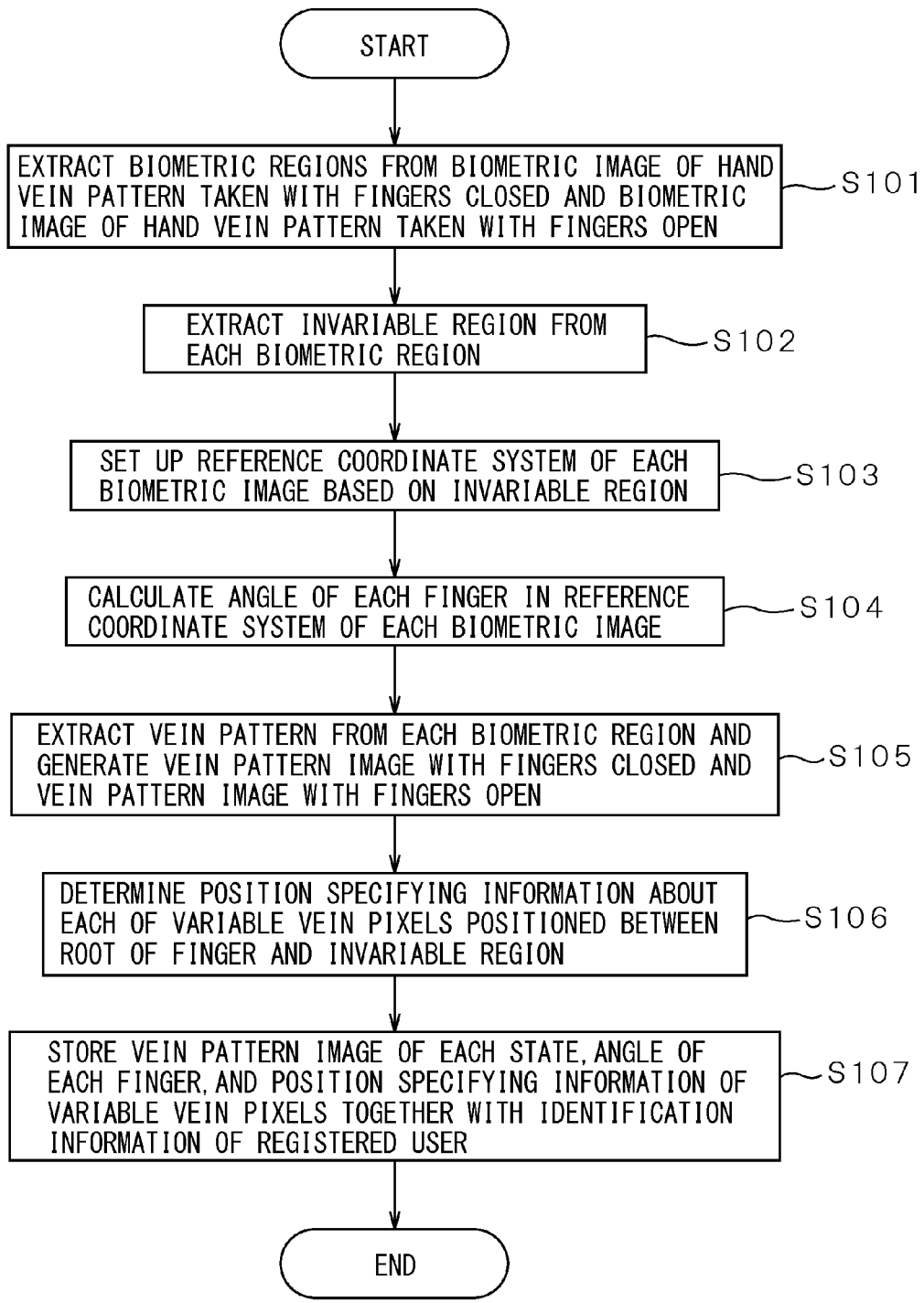
FIG. 5 is a diagram depicting an operational flowchart of registration process.

FIG. 5 is an operational flowchart of registration process executed by the processing unit 7. The processing unit 7 receives the two biometric images representing the vein patterns of the hand of the user captured in the fingers-open state and in the fingers-closed state from the biometric information acquisition unit 4. Then, the biometric region extraction unit 11 of the processing unit 7 extracts a biometric region from each of the biometric images (step S101). The invariable region extraction unit 12 of the processing unit 7 extracts, from the biometric region of the each biometric image, an invariable region that is a region where positions of the veins do not vary even when the angles of the fingers vary (step S102). In addition, the invariable region extraction unit 12 sets up a reference coordinate system based on the invariable region in the each biometric image (step S103).

The angle calculation unit 13 of the processing unit 7 calculates an angle of each finger according to the reference coordinate system in the each biometric image (step S104). In addition, the vein pattern extraction unit 14 of the processing unit 7 extracts the vein pattern from the each biometric image and performs binarization and thinning process to generate a vein pattern image corresponding to the fingers-open state and a vein pattern image corresponding to the fingers-closed state (step S105). Furthermore, the vein pattern extraction unit 14 obtains position specifying information of each of variable vein pixels positioned between the each finger and the invariable region (step S106). The registration unit 15 of the processing unit 7 stores the identification information of the user obtained from the input unit 3 together with the invariable region representing information corresponding to the fingers-closed state and the fingers-open state, the vein pattern images, the each variable vein pixel and its position specifying information, and the angles of the respective fingers in the storage unit 5 (step S107). Then, the processing unit 7 ends the registration process.

Biometric Authentication Processing

Next, a description will be given of biometric authentication process. In the present embodiment, the biometric authentication process may be executed according to either a so-called 1:1 authentication system in which a registered user as an object for matching is identified by obtaining the identification information of a registered user through the input unit 3 or a so-called 1:N authentication system in which a registered user as an object for matching is not identified.

Upon execution of biometric authentication process also, as in the registration, the processes of the biometric region extraction unit 11, the invariable region extraction unit 12, the angle calculation unit 13, and the vein pattern extraction unit 14 are performed on an input biometric image generated at the time of execution of the biometric authentication process. Then, the angles of respective fingers are calculated and a vein pattern image is generated. Upon execution of the biometric authentication process, the biometric authentication apparatus 1 generates only one input biometric image. Thus, the invariable region extraction unit 12 specifies an invariable region by a pattern matching between the input biometric image and the reference model image. Alternatively, the invariable region extraction unit 12 may specify an invariable region in the input biometric image by a pattern matching between a registered biometric image in either the fingers-closed state or the fingers-open state specified according to the identification information of a user input through the input unit 3 and the input biometric image.

The correction unit 16 obtains, as a position correction coefficient for each finger, a ratio of a difference between the angle of the finger obtained from the input biometric image and the angle of the finger in the fingers-closed state or the fingers-open state to a difference between the angle of the finger in the fingers-closed state and the angle thereof in the fingers-open state. Then, the correction unit 16 corrects the vein pattern in the fingers-closed state or the vein pattern in the fingers-open state so as to cancel a difference in the shape between the vein patterns due to the difference of the angles of the fingers according to the position correction coefficients.

Therefore, the correction unit 16 calculates, for each finger, a position correction coefficient rc for the vein pattern image in the fingers-closed state and a position correction coefficient ro for the vein pattern image in the fingers-open state according to the following equation:

$$rc=(\phi o-\phi)/(\phi o-\phi c); ro=(\phi-\phi c)/(\phi o-\phi c) \quad (1)$$

In the equation, $\phi$ represents an angle of a finger of interest with respect to the axis x of the reference coordinate system in the input biometric image; and $\phi c$ and $\phi o$ represent an angle of the finger of interest with respect to the axis x of the reference coordinate system on the biometric image in the fingers-closed state and on the biometric image in the fingers-open state, respectively.

The correction unit 16 sets, for each finger, an internally dividing point related to the finger between the pairs of variable vein pixels capturing the same venous portion in the biometric image in the fingers-closed state and in the biometric image in the fingers-open state, to a positionally corrected pixel capturing the same venous portion. The internally dividing point dp(x, y) is calculated using the position correction coefficients rc and ro according to the following equation:

$$dp(x, y)=rc*vc(x, y)+ro*vo(x,y) \quad (2)$$

"vc(x, y)" represents a position of the variable vein pixel in the vein pattern image with the fingers closed; and "vo (x,y)" represents a position of the variable vein pixel in the vein pattern image with the fingers open, in which the same portion as a part of the veins captured in the vc(x, y) is captured. The correction unit 16 specifies a pair of variable vein pixels capturing the same venous portion according to the following procedures.

First, the correction unit 16 detects a pair of an invariable boundary pixel in the vein pattern image with the fingers closed and an invariable boundary pixel in the vein pattern image with the fingers open, whose coordinates in the reference coordinate system are the same as or substantially the same as those of the former pixel. It is presumed that the same venous portion is captured in the two invariable boundary pixels. Accordingly, the correction unit 16 determines two variable vein pixels each connected to one of the invariable boundary pixels along the vein and have an equal distance along the vein from one thereof in each vein pattern image as a pair of variable vein pixels capturing the same venous portion.

Figure 6:
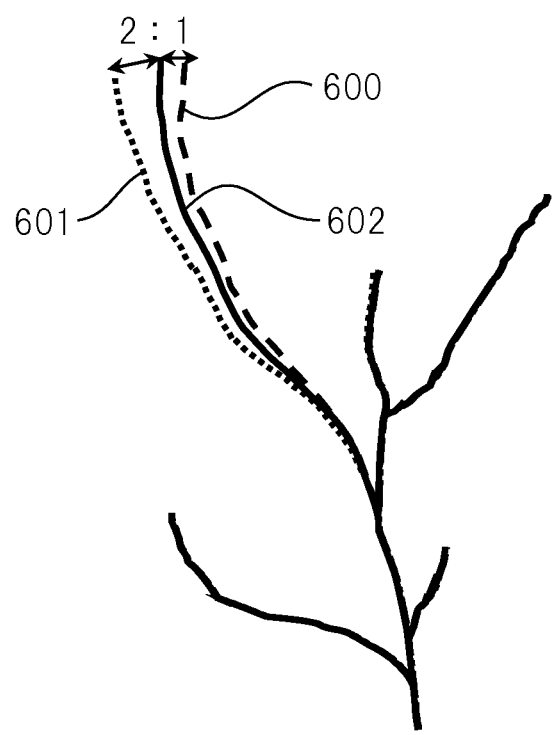
FIG. 6 is a view depicting an example of a vein pattern positionally corrected from a vein pattern of a fingers-open state and a vein pattern of a fingers-closed state according to an angle of the finger.

FIG. 6 is a view depicting an example of a vein pattern positionally corrected from a vein pattern of the fingers-open state and a vein pattern of the fingers-closed state. In FIG. 6, a vein pattern 600 is a vein pattern near an index finger extracted from a biometric image taken in a fingers-closed state; and a vein pattern 601 is a vein pattern near the index finger extracted from a biometric image taken in a fingers-open state. In addition, for example, an angle of the index finger with respect to the axis x of the reference coordinate system in the fingers-closed state is set to 90 degrees, and an angle of the index finger with respect to the axis x of the reference coordinate system in the fingers-open state is set to 120 degrees. In this case, when the angle of an index finger with respect to the axis x of the reference coordinate system obtained from an input biometric image is 100 degrees, the respective position correction coefficients rc and ro are ⅔ and ⅓, from the equation (1). Therefore, as depicted in FIG. 6, the positionally corrected vein pattern 602 is in a position internally dividing the distance between the vein pattern 600 and the vein pattern 601 into 1:2.

The correction unit 16 sends the corrected vein pattern image representing a vein pattern positionally corrected based on the two vein pattern images of a registered user together with identification information of the registered user to the matching unit 17. In addition, when the 1:N authentication system is employed, the correction unit 16 performs the above process on all registered users to generate a corrected vein pattern image of each registered user and sends the corrected vein pattern image and identification information of the registered user to the matching unit 17.

The matching unit 17 matches the input vein pattern image generated from the input biometric image and the corrected vein pattern image to calculate a degree of similarity between the vein pattern depicted in the input vein pattern image and the corrected vein pattern depicted in the corrected vein pattern image.

For example, the matching unit 17 may calculate the degree of similarity by performing a pattern matching between the input vein pattern image and the corrected vein pattern image. In this case, the matching unit 17 obtains normalized cross correlation values while changing a relative position of the input vein pattern image with respect to the corrected vein pattern image and calculates a maximum value of the normalized cross correlation values as a similarity value.

Alternatively, the matching unit 17 may extract feature points such as venous bifurcations or endings from each of the input vein pattern image and the corrected vein pattern image and may calculate a degree of matching between the feature points as the degree of similarity. In this case, the matching unit 17 scans on each of the input vein pattern image and the corrected vein pattern image by using a plurality of templates corresponding to either venous bifurcations or venous endings. Then, the matching unit 17 detects, as feature points, positions of those points in the vein pattern images matching with any of the templates.

The matching unit 17 obtains the number of feature points matching between feature points detected from the input vein pattern image and those detected from the corrected vein pattern image. Then, the matching unit 17 can calculate the degree of similarity by dividing the number of the matching feature points by the number of the feature points detected from the input vein pattern image.

The matching unit 17 sends the degree of similarity together with the identification information of the registered user to the authentication judgment unit 18.

When the identification information of a user is not input, the matching unit 17 executes the above process on each registered user to obtain the degree of similarity in the each registered user. Then, the matching unit 17 selects a registered user having a maximum degree of similarity. Next, the matching unit 17 sends a maximum value of the degree of similarity and identification information of the registered user corresponding to the maximum value to the authentication judgment unit 18.

The authentication judgment unit 18 compares the degree of similarity with an authentication judgment threshold value to judge whether or not to authenticate the user as the registered user. For example, the authentication judgment unit 18 judges that the vein pattern of the user captured in the input biometric image matches with the vein pattern of the registered user when the degree of similarity is not less than the authentication judgment value. Then, the authentication judgment unit 18 authenticates the user as the registered user. The authentication judgment unit 18 notifies the authentication result to the processing unit 7 after authentication of the user. Then, the processing unit 7 allows the authenticated user to use an apparatus incorporating the biometric authentication apparatus 1 or an apparatus connected with the biometric authentication apparatus 1.

On the other hand, when the degree of similarity is below the authentication judgment threshold value, the authentication judgment unit 18 does not authenticate the user and notifies the processing unit 7 that the user has not been authenticated. In this case, the processing unit 7 refuses to allow the user to use an apparatus incorporating the biometric authentication apparatus 1 or an apparatus connected therewith. Additionally, the processing unit 7 may allow the display unit 2 to display a message indicating the authentication failure.

The authentication judgment threshold value is preferably set to a value allowing the authentication judgment unit 18 to succeed in authentication only when the registered user himself or herself is the user. In addition, the authentication judgment threshold value is preferably set to a value allowing the authentication judgment unit 18 to fail in authentication when someone else different from the registered user is the user. For example, the authentication judgment threshold value may be a value obtained by adding a value obtained by multiplying a difference between a possible maximum value and a possible minimum value of the degree of similarity by 0.7 to the minimum value of the degree of similarity.

Figure 7:
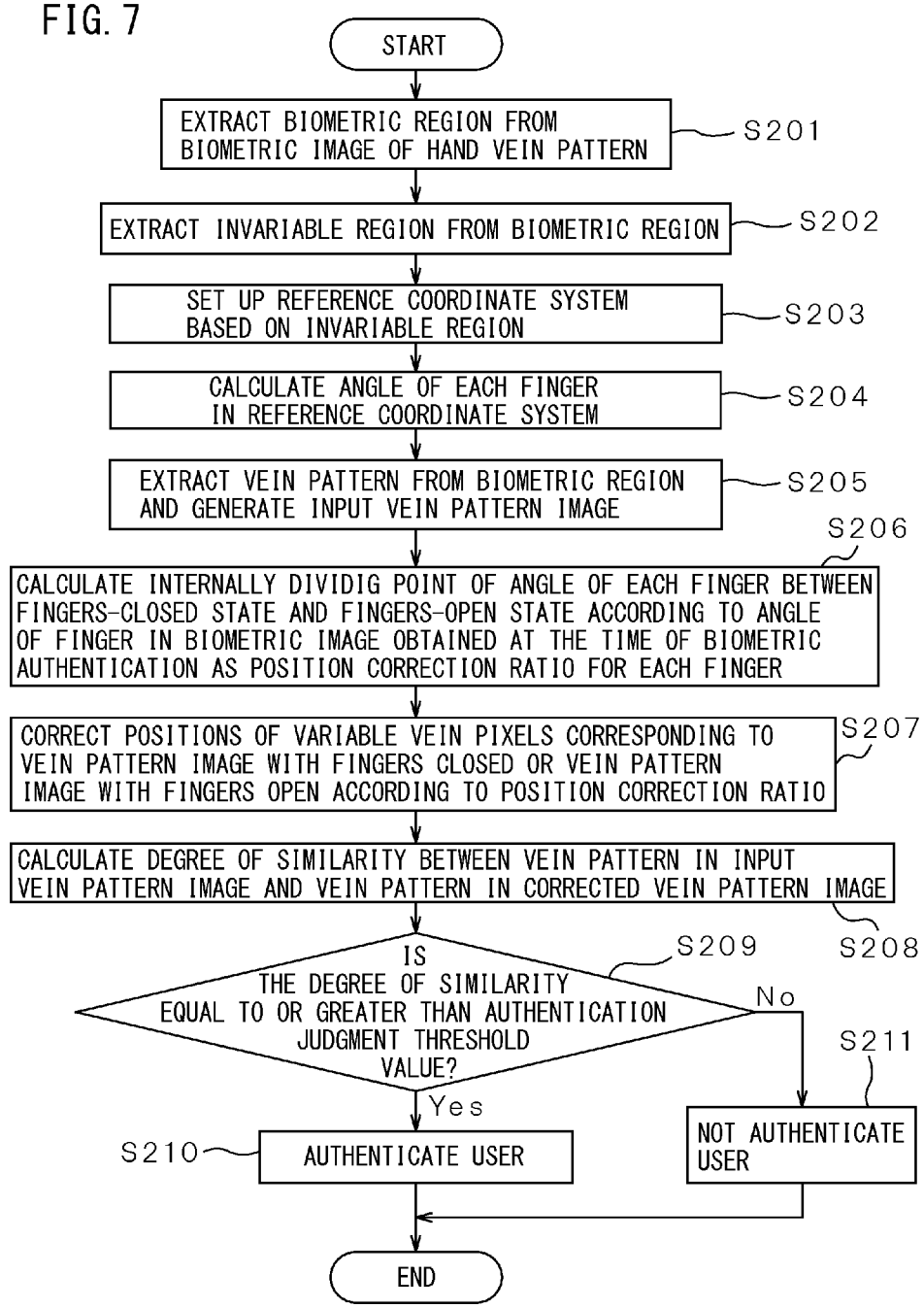
FIG. 7 is a diagram depicting an operational flowchart of biometric authentication process.

FIG. 7 is an operational flowchart of biometric authentication process executed by the processing unit 7. When the processing unit 7 receives an input biometric image representing a hand vein pattern of a user from the biometric information acquisition unit 4, the biometric region extraction unit 11 of the processing unit 7 extracts a biometric region from the input biometric image (step S201). The invariable region extraction unit 12 of the processing unit 7 extracts an invariable region that is a region in which venous positions are invariable even when the angles of fingers vary, from the biometric region in the input biometric image (step S202). Then, the invariable region extraction unit 12 sets up a reference coordinate system with reference to the invariable region in the input biometric image (step S203).

In addition, the angle calculation unit 13 of the processing unit 7 calculates an angle of each finger according to the reference coordinate system in the input biometric image (step S204). Then the angle calculation unit 13 notifies the angle of each finger to the correction unit 16 of the processing unit 7. In addition, the vein pattern extraction unit 14 of the processing unit 7 extracts the vein pattern from the input biometric image and performs binarization and thinning process to generate an input vein pattern image representing the shape of the hand vein pattern of the user (step S205). Then, the vein pattern extraction unit 14 sends the input vein pattern image to the matching unit 17 of the processing unit 7.

The correction unit 16 calculates, as a position correction ratio for each finger, an internal division of an angle of the each finger between the fingers-closed state and the fingers-open state according to the angle of the finger in a biometric image obtained at the time of biometric authentication (step S206). Then, the correction unit 16 corrects the positions of the corresponding variable vein pixels in the vein pattern image with the fingers closed and the vein pattern image with the fingers open to generate a corrected vein pattern image (step S207). Then, the correction unit 16 sends the corrected vein pattern image to the matching unit 17.

The matching unit 17 calculates a degree of similarity between the vein pattern in the input vein pattern image and the vein pattern in the corrected vein pattern image (step S208). Next, the matching unit 17 sends the identification information of a registered user together with the degree of similarity to the authentication judgment unit 18 of the processing unit 7. When the identification number of the user is not available, the matching unit 17 obtains a maximum value of the degree of similarity obtained regarding each registered user. Then, the matching unit 17 sends, together with the maximum value, the identification information of a registered user corresponding to the maximum value to the authentication judgment unit 18.

The authentication judgment unit 18 judges whether the degree of similarity is not less than the authentication judgment threshold value (step S209). When the degree of similarity is not less than the authentication judgment threshold value (step S209—Yes), the authentication judgment unit 18 authenticates the user as the registered user (step S210). On the other hand, when the degree of the similarity is below the authentication judgment threshold value (step S209—No), the authentication judgment unit 18 does not authenticate the user (step S211). After the step S210 or S211, the processing unit 7 ends the biometric authentication process.

As have been described above, at the time of registration, the biometric authentication apparatus obtains in advance an index representing the posture of fingers from each of two biometric images taken in the states in which the postures of the fingers affecting the shape of biometric information of a hand are different from each other. Additionally, the biometric authentication apparatus obtains an index representing the posture of fingers from an input biometric image acquired at the time of matching. Then, based on the index at the time of the matching and the indexes at the time of the registration, the biometric authentication apparatus reshapes data representing the shape of the biometric information at the time of registration so as to cancel a difference in the shape between the pieces of the biometric information due to a difference between the finger posture at the time of registration and that at the time of biometric authentication. Next, the biometric authentication apparatus executes matching process using the reshaped biometric information. Therefore, the biometric authentication apparatus can suppress reduction in accuracy of genuine identity authentication even when local deformation due to the posture of fingers is included in hand biometric information captured in a biometric image at the time of matching against hand biometric information captured in a biometric image at the time of registration.

According to a modified example, the biometric authentication apparatus may use, as an index representing the posture of fingers, a distance between the roots of adjacent fingers instead of the angles of fingers.

Figure 8:
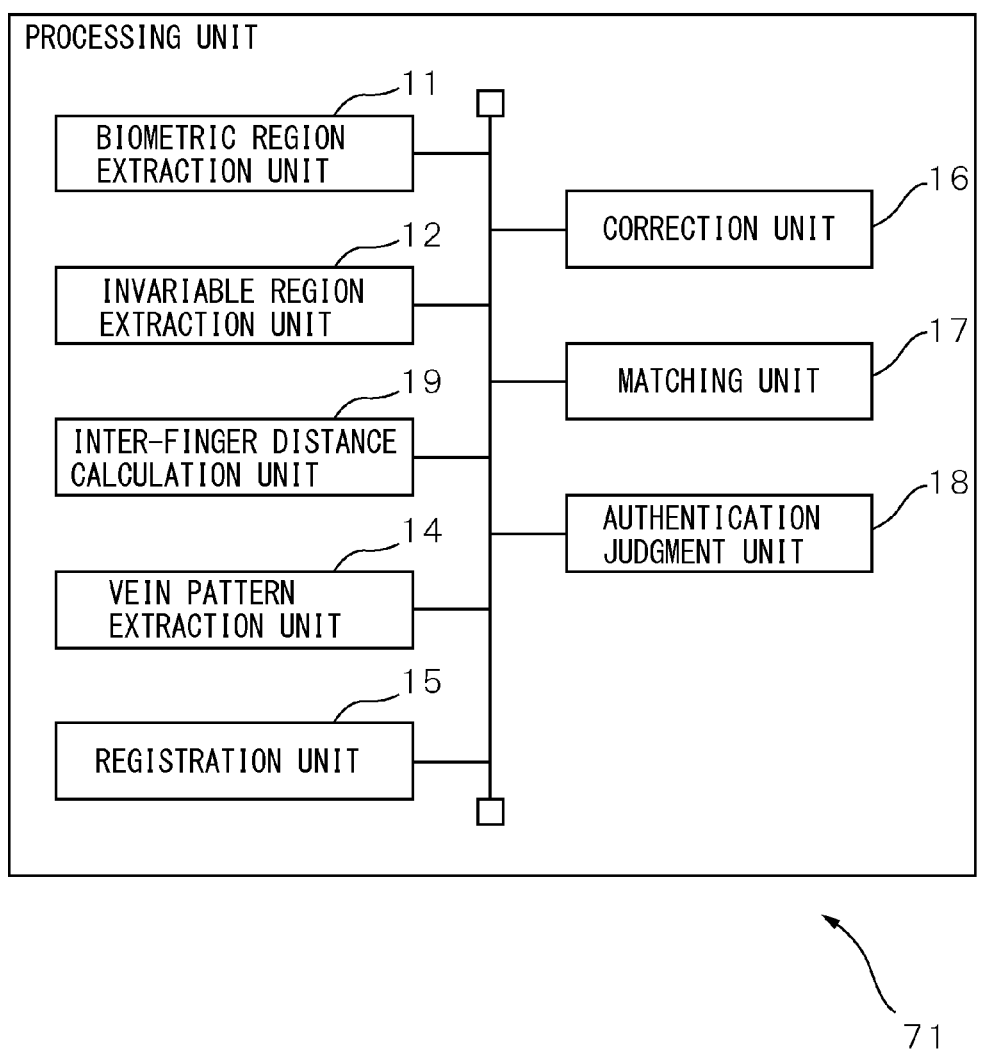
FIG. 8 is a functional block diagram of a processing unit according to a modified example.

FIG. 8 is a functional block diagram of a processing unit according to the modified example. A processing unit 71 includes a biometric region extraction unit 11, an invariable region extraction unit 12, an inter-finger distance calculation unit 19, a vein pattern extraction unit 14, a registration unit 15, a correction unit 16, a matching unit 17, and an authentication judgment unit 18. In FIG. 8, the respective constituent elements included in the processing unit 71 are given the same reference numerals as those of the corresponding constituent elements of the processing unit 7 depicted in FIG. 2.

The processing unit 71 depicted in FIG. 8 is different from the processing unit 7 depicted in FIG. 2 in terms of including the inter-finger distance calculation unit 19 instead of the angle calculation unit 13. Thus, a description below will be given of the inter-finger distance calculation unit 19 and portions relevant thereto.

The inter-finger distance calculation unit 19 is another example of the posture specification unit. The inter-finger distance calculation unit 19 calculates a distance between the roots of two fingers adjacent to each other in a biometric image representing a vein pattern in the fingers-closed state and a distance between the roots of two fingers adjacent to each other in a biometric image representing a vein pattern in the fingers-open state, as indexes representing the respective postures of the fingers. To do this, for example, the inter-finger distance calculation unit 19 sequentially tracks contour pixels representing the contour of each finger in order from an upper side to a lower side of the biometric image to obtain the coordinates of connecting points at which contour pixels of the adjacent fingers are connected to each other, in the axis y direction of the reference coordinate system. Next, the inter-finger distance calculation unit 19 designates, of the left and right connecting points of a finger of interest, a connecting point closer to the upper end of the biometric image as a connecting point corresponding to the root of the finger. However, regarding the thumb and the little finger, only one-side connecting points are detected. Accordingly, the inter-finger distance calculation unit 19 designates the detected connecting points as those corresponding to the roots of the thumb and the little finger.

The inter-finger distance calculation unit 19 designates, for each finger, an intersection point of a perpendicular line drawn down from the connecting point of the finger to the centerline thereof and the centerline as a root position of the finger. Then, the inter-finger distance calculation unit 19 calculates a distance between the root positions of the adjacent fingers as an inter-finger distance.

In the modified example also, at the time of registration, there are obtained a biometric image of a hand vein pattern in the fingers-open state and a biometric image of a hand vein pattern in the fingers-closed state. Then, inter-finger distances in each of the biometric images are calculated. The inter-finger distances are stored together with the vein pattern images, variable vein pixels, position specifying information, and the like in the storage unit.

Similarly upon execution of biometric authentication process, the inter-finger distance calculation unit 19 calculates a distance between the root positions of adjacent fingers from an input biometric image. Then, the correction unit 16 calculates position correction coefficients rc and ro using the inter-finger distance instead of the angles of the fingers in the equation (1). However, in this case, the correction unit 16 uses position correction coefficients calculated based on the inter-finger distance of two fingers of interest to correct the positions of variable vein pixels positioned between the respective centerlines of the two fingers.

Furthermore, according to another modified example, shape data representing the shape of biometric information of a hand may include the coordinates of feature points such as venous bifurcations and endings. In this case, the vein pattern extraction unit may extract the feature points by performing a template matching between a vein pattern image and a template representing bifurcations or endings at the time of matching and at the time of registration, as described in relation to the matching unit.

In addition, the correction unit selects a second feature point closest to a first feature point outside the invariable region in the vein pattern image with the fingers closed, among feature points outside the invariable region in the vein pattern image with the fingers open in the reference coordinate system. Then, the correction unit applies the equation (2) using coordinates of the first feature point as vc(x, y) and coordinates of the second feature point as vc(x, y), thereby correcting the positions of the feature points.

In addition, biometric information of a hand to be used by the present embodiment or the modified examples is not limited to a hand vein pattern. For example, a palm print may be used as the biometric information of a hand.

Furthermore, the biometric authentication apparatus and the biometric authentication method disclosed in the present specification are applicable to various apparatuses or systems that execute biometric authentication process between biometric information of a user and pre-registered biometric information to allow the user to perform an operation.

Figure 9:
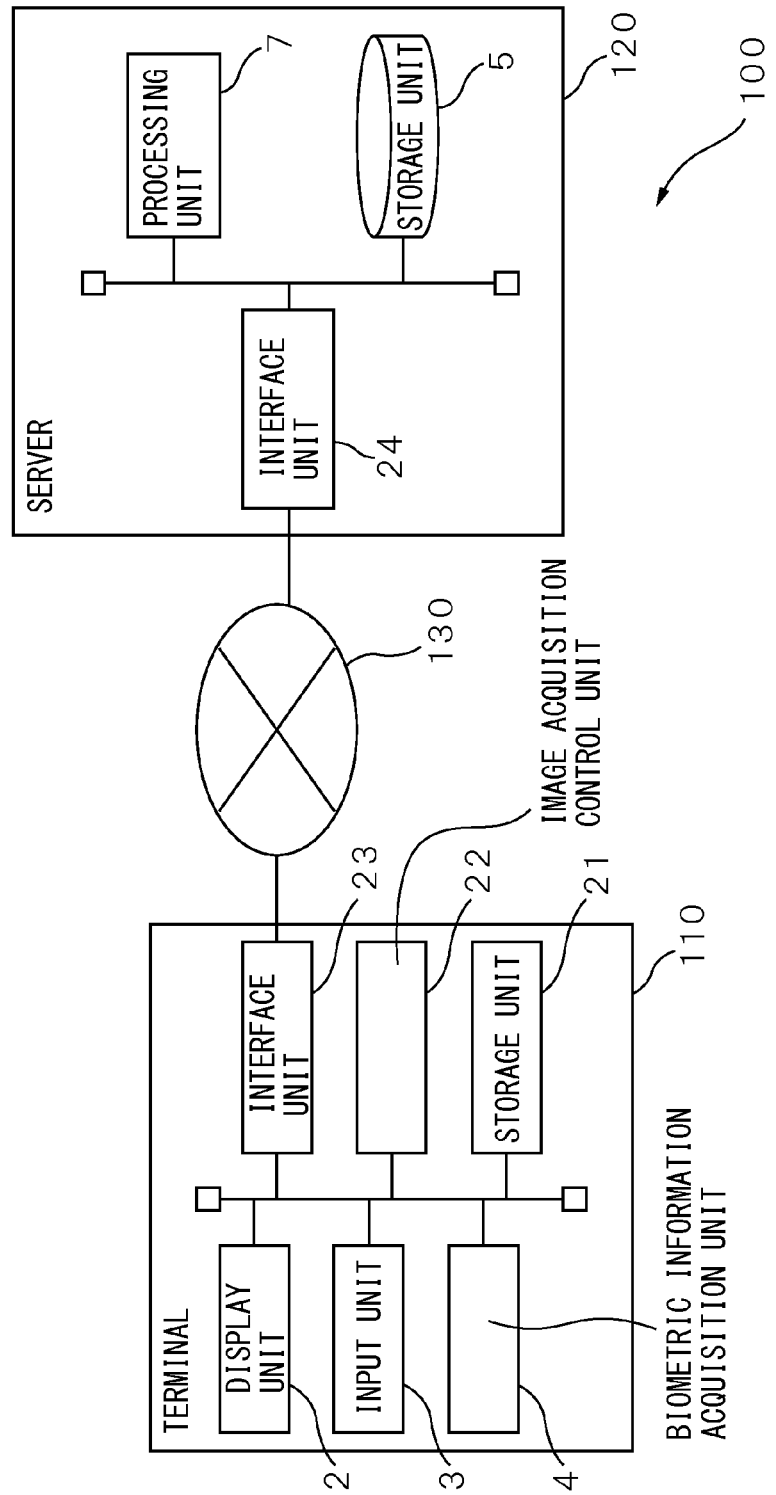
FIG. 9 is a schematic structural diagram of a computer system incorporating a biometric authentication apparatus according to one embodiment or a modified example thereof.

FIG. 9 is a schematic structural diagram of an example of a computer system that incorporates the biometric authentication apparatus according to any one of the respective embodiments or the modified examples thereof.

For example, a computer system 100 includes at least one terminal 110 and a server 120. In addition, the terminal 110 and the server 120 are connected through a wired or wireless communication network 130. Of constituent elements included in the computer system 100 in FIG. 9, constituent elements corresponding to any of those included in the biometric authentication apparatus 1 depicted in FIG. 1 are given the same reference numerals as those of the constituent elements in the biometric authentication apparatus 1.

In this system, the terminal 100 is, for example, a mobile terminal such as a mobile phone or a tablet terminal, or a fixed terminal, and includes a display unit 2, an input unit 3, and a biometric information acquisition unit 4. The terminal 110 further includes a storage unit 21, an image acquisition control unit 22, and an interface unit 23.

The storage unit 21 includes, for example, a semiconductor memory circuit to temporarily store a biometric image generated by the biometric information acquisition unit 4. In addition, the image acquisition control unit 22 includes one or more processors and peripheral circuits thereof to control each unit of the terminal 110 and execute various programs operated on the terminal 110. In addition, the image acquisition control unit 22 transmits biometric images capturing hand vein patterns generated by the biometric information acquisition unit 4 to the server 120 through the interface unit 23 including an interface circuit for connecting the terminal 110 with the communication network 130. Furthermore, the image acquisition control unit 22 may also transmit user identification information input through the input unit 3 to the server 120.

The server 120 includes a storage unit 5, a processing unit 7, and an interface unit 24 including an interface circuit for connecting the server 120 with the communication network 130. The processing unit 7 of the server 120 executes biometric authentication process by implementing each function of the processing unit according to any one of the above embodiments or the modified examples thereof using the biometric images received through the interface unit 24. Then, the server 120 returns a judgment result on success or failure in authentication to the terminal 110 through the interface unit 24.

Alternatively, the image acquisition control unit 22 may execute the processes of the biometric region extraction unit, the invariable region extraction unit, the angle calculation unit or the inter-finger distance calculation unit, and the vein pattern extraction unit among the functions of the processing unit according to any one of the embodiments or the modified examples. In this case, data relating to biometric information extracted from the biometric image of a user and identification information of the user may be transmitted from the terminal 110 to the server 120. On the other hand, the processing unit 7 of the server 120 executes only the processes of the matching unit, the authentication judgment unit, and the registration unit among the functions of the processing unit according to the respective embodiments. This reduces load on the server 120, so that the computer system 100 can reduce a waiting time of the user even when a plurality of biometric authentication processes are simultaneously executed.

In addition, a computer program including commands that cause a computer to execute the functions of the processing unit according to each of the above embodiments may be provided in a form stored on a recorded medium such as a magnetic recording medium, an optical recording medium, or a nonvolatile semiconductor memory.

All examples and conditional language recited herein are intended for pedagogical purposes to aid the reader in understanding the invention and the concepts contributed the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it is to be understood that the various changes, substitutions, and alterations could be made hereto without departing from the spirit and scope of the invention.

What is claimed is:

1. A biometric authentication apparatus comprising:
   a storage unit which stores first shape data representing a shape of biometric information of a hand of a registered user in a state in which fingers of the hand take a first posture, a first index representing the first posture, second shape data representing a shape of biometric information of the hand of the registered user in a state in which the fingers of the hand take a second posture, and a second index representing the second posture;
   a biometric information acquisition unit which generates a biometric image representing biometric information of a hand of a user;
   a posture specification unit which calculates a third index representing a third posture of fingers of the hand of the user captured in the biometric image from the biometric image;
   a biometric information extraction unit which generates third shape data representing a shape of the biometric information of the hand of the user captured in the biometric image based on the biometric image;
   a correction unit which obtains corrected shape data by correcting the first shape data or the second shape data to cancel a shape difference of the biometric information due to a difference between the third posture and the first posture or the second posture according to a ratio of a difference between the third index and the first index or the second index to a difference between the first index and the second index; and
   a matching unit which matches the third shape data and the corrected shape data.

2. The biometric authentication apparatus according to claim 1, wherein each of the first index and the second index represents an angle of at least a first finger of the registered user with respect to a predetermined direction, and the third index represents an angle of the first finger of the user with respect to the predetermined direction.

3. The biometric authentication apparatus according to claim 2, wherein an open angle between adjacent two fingers of the registered user in the first posture differs from an open angle between the two fingers in the second posture.

4. The biometric authentication apparatus according to claim 1, wherein each of the first index and the second index represents a distance between adjacent roots of the first finger and a second finger of the registered user, and the third index represents a distance between the roots of the first finger and the second finger of the user.

5. The biometric authentication apparatus according to claim 1, wherein
   each of the biometric information of the hand of the registered user and the biometric information of the hand of the user is a hand vein pattern, the first shape data is a first image representing a vein pattern of the hand of the registered user in the first posture, and the second shape data is a second image representing a vein pattern of the hand of the registered user in the second posture,
   the storage unit further stores an invariable region obtained by excluding a part in which a shape of the vein pattern of the hand of the registered user in the state in which the fingers of the hand take the first posture does not match with a shape of the vein pattern of the hand of the registered user in the state in which the fingers of the hand take the second posture from a region capturing the hand of the registered user in each of the first and the second images, and
   the correction unit obtains the corrected shape data by setting an internally dividing point determined according to the ratio between a first pixel distant by a predetermined number of pixels along any of veins in the first image from a first point as an intersection of the vein and a boundary of the invariable region and a second pixel distant by the predetermined number of pixels along the vein from the first point in the second image, to a position of the vein.

6. A biometric authentication method comprising:
   generating a biometric image representing biometric information of a hand of a user;
   calculating, from the biometric image, a first index representing a first posture of fingers of the hand of the user captured in the biometric image;
   generating first shape data representing a shape of the biometric information of the hand of the user captured in the biometric image based on the biometric image;
   obtaining corrected shape data by correcting, according to a ratio of a difference between the first index and a second index representing a second posture of fingers of a hand of a registered user or a third index representing a third posture of the fingers of the hand of the registered user to a difference between the second index and the third index, second shape data representing a shape of biometric information of the hand of the registered user in a state in which the fingers of the hand of the registered user take the second posture or third shape data representing a shape of biometric information of the hand of the registered user in a state in which the fingers of the hand of the registered user take the third posture to cancel a shape difference of the biometric information due to a difference between the first posture and the second posture or the third posture; and matching the first shape data and the corrected shape data.

7. The biometric authentication method according to claim 6, wherein each of the second index and the third index represents an angle of at least a first finger of the registered user with respect to a predetermined direction, and the first index represents an angle of the first finger of the user with respect to the predetermined direction.

8. The biometric authentication method according to claim 7, wherein an open angle between adjacent two fingers of the registered user in the second posture differs from an open angle between the two fingers in the third posture.

9. The biometric authentication method according to claim 6, wherein each of the second index and the third index represents a distance between adjacent roots of the first finger and a second finger of the registered user, and the first index represents a distance between roots of the first finger and the second finger of the user.

10. The biometric authentication method according to claim 6, wherein each of the biometric information of the hand of the registered user and the biometric information of the hand of the user is a hand vein pattern, the second shape data is a first image representing a vein pattern of the hand of the registered user in the second posture, and the third shape data is a second image representing a vein pattern of the hand of the registered user in the third posture, and the obtaining corrected shape data obtains the corrected shape data by setting an internally dividing point determined according to the ratio between a first pixel distant by a predetermined number of pixels along any of veins in the first image from a first point at which a boundary of an invariable region obtained by excluding a part in which a shape of the vein pattern of the hand of the registered user in the state in which the finger of the hand takes the second posture does not match with a shape of the vein pattern of the hand of the registered user in the state in which the fingers of the hand take the third posture from a region capturing the hand of the registered user in each of the first and the second images intersects with the vein and a second pixel distant by the predetermined number of pixels along the vein from the first point in the second image to a position of the vein.

11. A non-transitory computer-readable recording medium having recorded thereon a computer program for biometric authentication that causes a computer to execute a process comprising:

calculating, from a biometric image representing biometric of a hand of a user, a first index representing a first posture of fingers of the hand of the user captured in the biometric image;

generating first shape data representing a shape of the biometric information of the hand of the user captured in the biometric image based on the biometric image;

obtaining corrected shape data by correcting, according to a ratio of a difference between the first index and a second index representing a second posture of fingers of a hand of a registered user or a third index representing a third posture of the fingers of the hand of the registered user to a difference between the second index and the third index, second shape data representing a shape of biometric information of the hand of the registered user in a state in which the fingers of the hand of the registered user take the second posture or third shape data representing a shape of biometric information of the hand of the registered user in a state in which the fingers of the hand of the registered user take the third posture to cancel a shape difference of the biometric information due to a difference between the first posture and the second posture or the third posture; and matching the first shape data and the corrected shape data.

12. The non-transitory computer-readable recording medium according to claim 11, wherein each of the second index and the third index represents an angle of at least a first finger of the registered user with respect to a predetermined direction, and the first index represents an angle of the first finger of the user with respect to the predetermined direction.

13. The non-transitory computer-readable recording medium according to claim 12, wherein an open angle between adjacent two fingers of the registered user in the second posture differs from an open angle between the two fingers in the third posture.

14. The non-transitory computer-readable recording medium according to claim 11, wherein each of the second index and the third index represents a distance between adjacent roots of the first finger and a second finger of the registered user, and the first index represents a distance between roots of the first finger and the second finger of the user.

15. The non-transitory computer-readable recording medium according to claim 11, wherein each of the biometric information of the hand of the registered user and the biometric information of the hand of the user is a hand vein pattern, the second shape data is a first image representing a vein pattern of the hand of the registered user in the second posture, and the third shape data is a second image representing a vein pattern of the hand of the registered user in the third posture, and the obtaining corrected shape data obtains the corrected shape data by setting an internally dividing point determined according to the ratio between a first pixel distant by a predetermined number of pixels along any of veins in the first image from a first point at which a boundary of an invariable region obtained by excluding a part in which a shape of the vein pattern of the hand of the registered user in the state in which the fingers of the hand take the second posture does not match with a shape of the vein pattern of the hand of the registered user in the state in which the fingers of the hand take the third posture from a region capturing the hand of the registered user in each of the first and the second images intersects with the vein and a second pixel distant by the predetermined number of pixels along the vein from the first point in the second image to a position of the vein.

* * * * *